UNITED STATES PATENT OFFICE.

GEORGE W. MAWBEY, OF JERSEY CITY, NEW JERSEY, ASSIGNOR TO AUGUST KRESS AND GEORGE CARRAGAN, OF BAYONNE, NEW JERSEY.

COMPOUND FOR SEALING VESSELS.

SPECIFICATION forming part of Letters Patent No. 655,935, dated August 14, 1900.

Application filed July 8, 1899. Serial No. 723,142. (No specimens.)

*To all whom it may concern:*

Be it known that I, GEORGE W. MAWBEY, a citizen of the United States, and a resident of Jersey City, in the county of Hudson and State of New Jersey, have invented certain new and useful Improvements in Compounds for Sealing Vessels, of which the following is a specification.

This invention relates to certain new and useful improvements in compounds for sealing vessels, and has for its object the production of a compound which may be easily handled and applied to the can or other vessel, which will effectually hermetically seal the same, which is not liable to be torn, broken, or disarranged upon applying the cap or cover to the vessel, which is impervious to hot water and which will not impart any taste, odor, or other deleterious effects to the contents of the vessel.

To these ends, therefore, my said compound or composition consists of gum-chicle and chloroform, combined preferably in substantially the following proportions, viz: gum-chicle, four parts; commercial chloroform, seven parts.

I prefer to first break, chop, grind, or otherwise divide the gum-chicle into comparatively-small pieces, as the smaller the pieces are the sooner they will be dissolved or combined with the chloroform. The chloroform is then added and the two ingredients are thoroughly stirred or agitated in a preferably-closed vessel, on account of the extreme volatility of the chloroform, until the gum is thoroughly dissolved and combined with the chloroform, the product being a thick adhesive solution sufficiently fluid to run or flow. The composition may then be applied, as by a machine or by dipping or by a brush, &c., to a can, jar, or other vessel or to the cover, cap, or other closure thereof, and said composition immediately adheres to the two meeting surfaces, hermetically sealing the joint, while the chloroform speedily evaporates, leaving only the highly-adhesive and air-tight mass of gum-chicle.

Obviously the preferred proportions above given may be greatly varied to meet special needs and requirements and to make the solution thinner or thicker, a thinner solution being usually required where it is applied by a machine than where it is applied by a brush or where the vessel or its cover is dipped, and other ingredients may be added for special purposes, without departing from the principle and scope of my said invention.

What I claim as my invention, and desire to secure by Letters Patent, is—

1. The composition of matter consisting of gum-chicle and chloroform, substantially as described.

2. The composition of matter consisting of four parts gum-chicle and seven parts commercial chloroform, substantially as described.

Signed at New York, in the county of New York and State of New York, this 7th day of July, A. D. 1899.

GEORGE W. MAWBEY.

Witnesses:
 FREDERIC CARRAGAN,
 J. B. TANNER.